(No Model.)
G. BAUMANN.
COVER FOR CANS, &c.
No. 512,090. Patented Jan. 2, 1894.
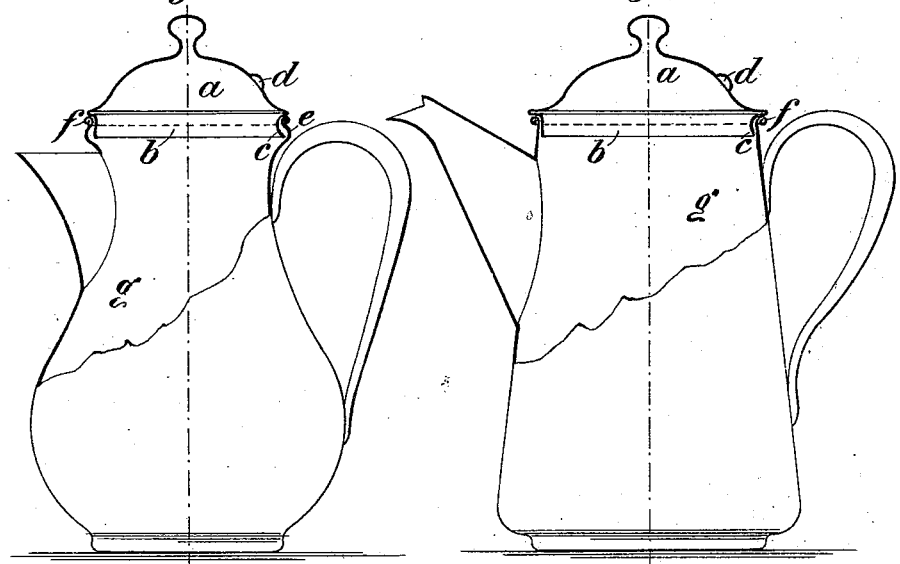
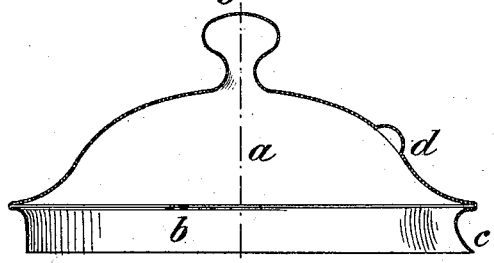
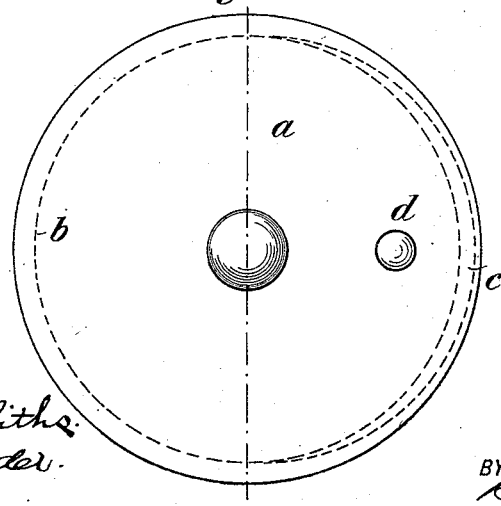

UNITED STATES PATENT OFFICE.

GEORG BAUMANN, OF AMBERG, GERMANY.

COVER FOR CANS, &c.

SPECIFICATION forming part of Letters Patent No. 512,090, dated January 2, 1894.

Application filed March 24, 1893. Serial No. 467,489. (No model.)

*To all whom it may concern:*

Be it known that I, GEORG BAUMANN, a subject of the King of Bavaria, and a resident of Amberg, Kingdom of Bavaria, Germany, have invented certain new and useful Improvements in Covers for Cans and other Vessels, of which the following is a specification.

This invention relates to improvements in covers for vessels of all kinds, but especially for coffee and tea pots, milk pitchers, &c.

The invention consists in a cover, the rim of which is provided at one side with an enlargement the ends of which taper or gradually merge into the remaining parts of the rim, and which enlargement engages the top edge of the vessel and holds the cover when the vessel is tilted to pour out its contents, thus preventing the disagreeable falling off of the cover without requiring hinges or like means.

In the accompanying drawings, Figures 1 and 2 are side views of a milk pitcher and coffee pot respectively, provided with my improved cover, parts being in section and others broken out. Fig. 3 is a vertical longitudinal sectional view of the cover, drawn on an enlarged scale. Fig. 4 is a plan view of the same.

Similar letters of reference indicate corresponding parts.

The cover $a$ which may be of any desired or known shape is provided with the downwardly extending rim $b$ which however is provided with an outwardly curved or bent enlargement $c$ of a length equal to about one third of the circumference of said rim, and which toward its ends gradually merges or tapers into the remaining parts of the rim which are at right angles to the cover. The enlargement $c$ is greatest, that is, its distance from the center of the cover is greatest at the center of the enlargement, and the location of this central part of the enlargement is indicated on the top of the cover by a protuberance or button $d$. The enlargement is in reality produced by projecting or offsetting the lower edge of the rim outwardly.

In using the cover the enlarged part is first inserted in the opening of the vessel $g$ as the bottom circumference of the rim is greater than the circumference of the opening of the vessel $g$ and then the opposite side of the cover is lowered. In vessels having conical or tapering necks or top parts the enlargement of the cover rests against said necks below the upper edge $f$ of the same, thus permitting that part of the rim that is at right angles to the cover of being readily inserted in the top opening of the vessel, as shown in Fig. 2.

In a cylindrical vessel or vessels that are only slightly tapering, a recess is formed below the rim $f$ for receiving the enlarged part $c$ of the cover rim. In tilting the vessel for the purpose of pouring out the contents thereof, the curved enlargement rests against the rim of the vessel at the rear or raised part of the top, and thus prevents the cover from dropping off.

In removing the cover, the front part is first lifted off, as the front part of the rim is at right angles to the cover and offers no obstructions. When the cover is on the vessel, the protuberance or button $d$ should always be to the rear, as the cover when in this position cannot fall off if the vessel is tilted. My improvements can be applied on covers of metal, plain or enameled, glass, porcelain, or other material.

The use of hinges for holding the cover can be dispensed with thus reducing the cost and also avoiding injury to the vessel and cover in applying the hinges.

Having thus described my invention, I claim as new and desire to secure by Letters Patent—

1. A cover for vessels having a part of its rim enlarged by projecting it outwardly at its lower edge, substantially as set forth.

2. A cover for vessels having a part of its rim enlarged by projecting it outwardly at its lower edge, the ends of said enlargement gradually merging or tapering into the remaining parts of the rim, substantially as set forth.

In testimony that I claim the foregoing as my invention I have signed my name in presence of two subscribing witnesses.

GEORG BAUMANN.

Witnesses:
CHRISTOLPH HEILING,
OSCAR BOCK.